United States Patent [19]

Kettner et al.

[11] 4,369,874
[45] Jan. 25, 1983

[54] DEVICE FOR DISENTANGLING ENTANGLED COMPONENTS

[76] Inventors: Hans Kettner, cFranzburger Strasse 14a, 3007 Gehrden; Odo Hütter, Mendelssohnstrasse 50, 3000 Hannover, both of Fed. Rep. of Germany

[21] Appl. No.: 191,340

[22] PCT Filed: Jun. 13, 1979

[86] PCT No.: PCT/DE79/00056

§ 371 Date: Feb. 13, 1980

§ 102(e) Date: Feb. 12, 1980

[87] PCT Pub. No.: WO80/00074

PCT Pub. Date: Jan. 24, 1980

[30] Foreign Application Priority Data

Jun. 13, 1978 [DE] Fed. Rep. of Germany ....... 2826245
Nov. 28, 1978 [DE] Fed. Rep. of Germany ....... 2851811

[51] Int. Cl.$^3$ ...................... B65G 47/14; B65G 47/24
[52] U.S. Cl. .................................. 198/396; 198/771; 198/953
[58] Field of Search .................. 209/1, 3, 235, 236, 209/274, 275, 346, 347, 479, 480, 20, 471, 472, 637, 694, 695, 929; 198/396, 757, 953, 771, 646, 692, 750, 752, 755, 762, 766; 221/160, 156; 222/161

[56] References Cited

U.S. PATENT DOCUMENTS

| | | | |
|---|---|---|---|
| 2,958,228 | 11/1960 | Carrier et al. | 198/752 X |
| 2,968,424 | 1/1961 | Lawson | 198/752 X |
| 3,042,181 | 7/1962 | Rise | 198/391 |
| 3,116,819 | 1/1964 | Katz | 198/771 X |
| 3,504,783 | 4/1970 | Kuschnereit | 198/953 X |
| 3,865,241 | 2/1975 | Crow | 209/472 X |
| 3,929,221 | 12/1975 | Armstrong | 198/771 |
| 3,966,040 | 6/1976 | Hazelwood | 198/391 |
| 4,078,994 | 3/1978 | Hazelwood | 209/235 |

OTHER PUBLICATIONS

"Guideline 3237 of the Ass'n. of German Engineers; Design of Finished Components With Regard to Automatic Feeding, Finishing and Assembling", Dusseldorf 1967, p. 1.
"Handhabung Von Wirrteilen," Fth-Fordern und Heben 27, Issue 10, 1972, pp. 82–86.
"Verkettungseinrichtugen in der Fertigungstechnik," Published by Carl Hansen Verlag, Munich, 1971, pp. 75 and 125.
"Boothroyd et al., "Mechanized Assembly", McGraw-Hill, London, 19th, pp. 23 and 81.

*Primary Examiner*—Ralph J. Hill
*Attorney, Agent, or Firm*—Manfred M. Warren; Robert B. Chickering; Glen R. Grunewald

[57] ABSTRACT

In many branches of industry large quantities of small items (e.g., wire components) or assembly components are frequently required, which have a strong tendency towards entangling and which conglomerate in a pile. These components, termed entangled components, can be isolated only with great difficulty when required for processing. This invention provides a device for isolating such entangled components with relative ease. For this purpose, a horizontal disentangling plate (1) is provided on which the entangled components (7) are placed. A vibrating device (2) shakes the disentangling plate (1) in a reciprocal motion in vertical direction, thus enabling the entangled components (7) to become isolated.

10 Claims, 10 Drawing Figures

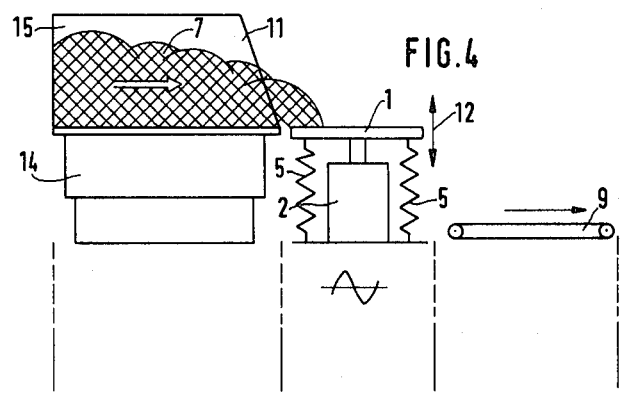
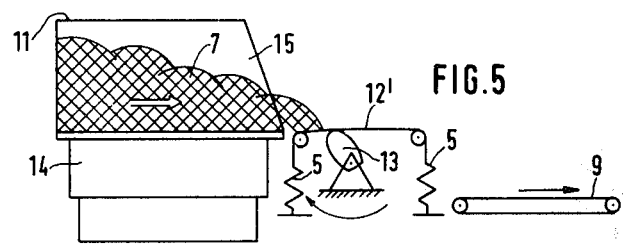
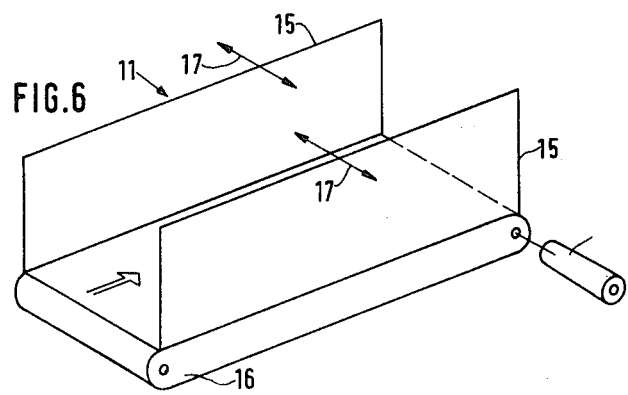

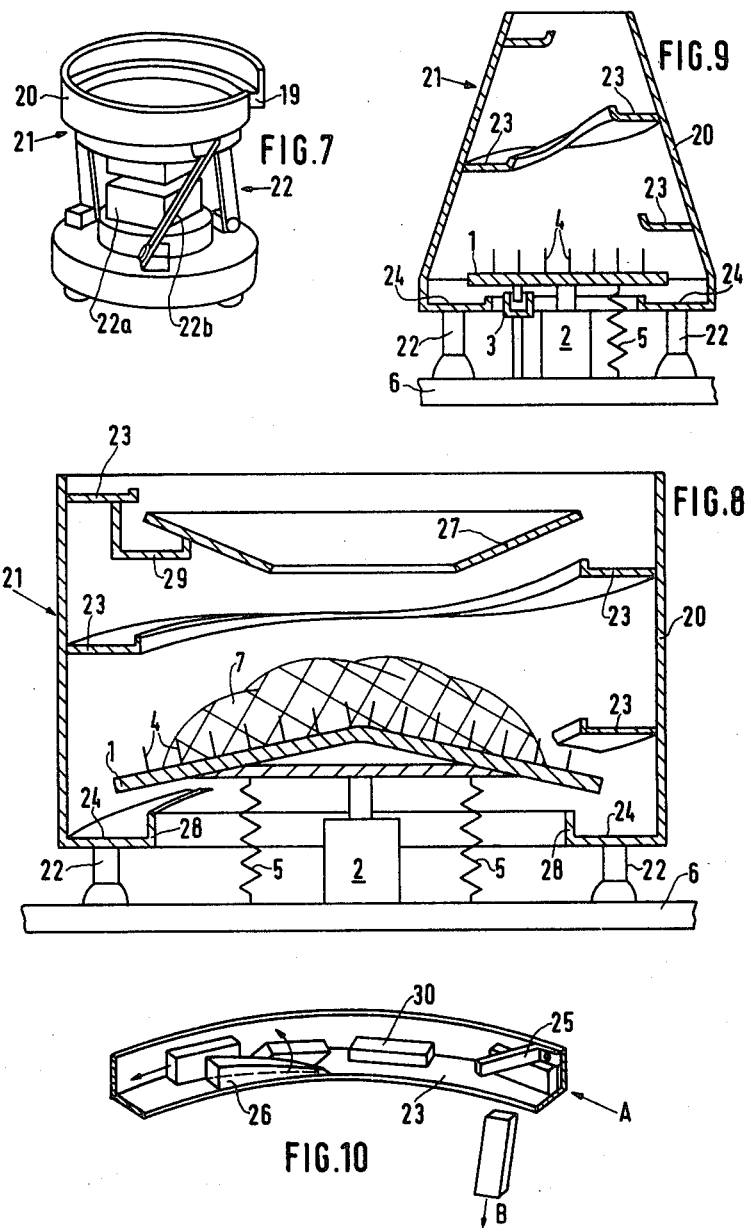

DEVICE FOR DISENTANGLING ENTANGLED COMPONENTS

TECHNICAL FIELD

This invention concerns a device for disentangling entangled components.

BACKGROUND ART

Large quantities of small items or components are very frequently used in processing and production plants. These may be wire components such as C-shaped snap rings, hook-shaped components, etc. It is known that they have a strong tendency towards entanglement and that they easily pile up in a cluster. Therefore, such components are generally termed tangled components (Guideline 3237 of the Association of German Engineers; Design of Finished Components with Regard to Automatic Feeding, Finishing and Assembling, page 1, Düsseldorf 1967).

As experience has shown, the isolating process of such tangled components is rather difficult. The attempt to remove individual components from the pile regularly results in the removal of a whole bunch of components which may consist of several hundred, usually very light-weight items. Owing to the fact that the items usually are jammed, hooked up or magnetic, the bunch is held together. An operator spends a great deal of time isolating tangled components for processing.

Automatic disentangling devices for isolating entangled components have been publicized by the magazine f+h-fördern und heben 27, (1977), issue 10, technical section mht, pp. 82-86, particularly picture 10 and 11 on page 85. At the so-called "brush-type discharge bin" the entangled components are dropped into a box-type funnel-shaped bin. A discharge outlet is situated at the bottom of the funnel-shaped bin, in which a cylinder-shaped revolving brush has been installed. By means of a drive the brush oscillates at an adjustable cycle and at a determinable angle. Owing to the bristles the pile is tossed to and fro, disentangled, and then discharged from the bin by means of the brush. In this case the disentangling process is effected partially by the impact on the bin wall, and partially due to the shearing effect of the brush (pile is being pulled apart).

Furthermore, the known "drum-type disentangler" consists of an unilaterally enclosed drum rotating a constant speed and which pushes the pile up via the lateral ribs and discharges it at the drum's center. During this process several components loosen; they then may fall through a support cross attached to one side of the drum, preventing the pile from dropping out.

However, the known disentangling devices are relatively susceptible to fault and may not always operate with optimal efficiency. They frequently tend to jam the "brush-type discharge bin." Frequently only a small bunch consisting of several entangled components loosens from the pile. When this small bunch is grabbed by the cylindrical brush, so as to be ejected through the outlet situated at the bottom of the bin, it may jam between the brush and edge of the outlet. Then the machine must be switched off, and the operator has to remove the jammed bunch from above. This is rather complicated because, in order to clear the outlet, the entire top of the pile has to be removed from the bin. The known device is therefore less advantageous.

On the other hand, if the above-mentioned bunch has nevertheless been ejected by the brush, one is faced with the disadvantage that the components are not entirely isolated. This fault must be corrected manually, or the bunch has to be returned to the bin.

Re-entanglement can be considered a further disadvantage. This means that, due to impact on the walls of the bin, disentangled components become re-entangled. It has been proved that known devices have a high degree of re-entanglement, which obviously is a negative aspect of the disentangling process as a whole.

Furthermore, the known disentangling devices are hardly flexible as they are only suitable for very few and specific types of components that are to be isolated. This is so partly because of the given dimension of the bin, and partly because of the given brush format. In order to disentangle components of varying sizes, devices of varying dimensions are required.

DISCLOSURE OF THE INVENTION

The task of this invention is based on a device for disentangling entangled components which is distinguished for its low susceptibility to fault and its nonjam and low re-entanglement characteristics. The device should at the same time be of simple structure and great flexibility, so as to be suitable for disentangling a large variety of components and items.

To meet this task, the device has a horizontally arranged disentangling plate on which the entangled items are placed and which is coupled to a vibrating device so as to move the plate reciprocally in vertical direction.

In this invention the disentangling process is effected by a reciprocal shaking motion in vertical direction. The device has a simple design, operates extremely trouble-free, and is easy to handle. A variety of components for disentanglement may be placed on the plate, thus allowing for greater flexibility. According to the invention, the device is largely free from re-entanglement. The impact coefficient of the pile caused by the reciprocating motion of the plate is "more cushioned" than that of the loosened components. Thus, the loosened components easily drift off the plate, whereas the pile remains. Tests have shown that this device virtually no longer shows any re-entanglement, particularly when, within the framework of an advantageous development of this invention, the surface of the disentangling plate is equipped with a number of vertically arranged pins.

The disentangling plate may have a functional flat design and be arranged in a sloped position, and a conveyor system may be attached to the sloped side of the plate. Isolated components may be conveyed to the destination by means of the conveyor system, i.e., a conveyor belt.

Furthermore, it is practical to attach a vertically upright side panel to the edge of the disentangling plate in such a way that one section remains without side panel so that the isolated components may emerge from this section.

A particularly advantageous development of the invention is that laterally adjacent to the plate a bin in the form of a storage unit is provided so as to accommodate the entangled components, and that the bin is situated on a conveyor so that the tangled components may be conveyed from the bin on the plate. Thus, a so-called storage zone is created (i.e., the bin in which the tangled components are stored), as well as a separate disentangling zone (the area of the disentangling plate). The device particularly benefits from separating the storage and disentangling zones. The aforementioned known "brush-type discharge bin" pushes the storage zone, i.e., the content of the bin within the pile, onto the sensitive disentangling zone, that is, onto the brush. Due to the relatively great weight, the disentangling process will be impaired. On the contrary, when clearing faults, the unit has to be switched off, and the entire pile must be removed in order to have access from above. This invention eliminates all these disadvantages, because the storage zone and disentangling zone are represented as two separate areas. Thus, the entangled and the isolated components which are to be ejected become independent entities. The entangled components stored in the storage zone have no influence on the disentangling process, thus creating a quasi-stationary disentangling process. Furthermore, a particularly easy-to-handle and accessible device has been created.

In another advantageous development it is provided that the plate is designed in the form of a flexible diaphragm. The diaphragm is driven from below by means of a striking device and thus effects the reciprocal motion in vertical direction. Again, the entangled components may be conveyed from the bib onto the diaphragm.

However, in practice the isolation of entangled components alone is not always adequate, and it may be desirous to convey components in specific quantities and at specific operating speeds successively to processing areas. It has become generally known that for this particular purpose ("Verkettungseinrichtungen in der Fertigungstechnik" published by Carl Hansen Verlag, Munich, 1971, pp. 75 and 125; "Mechanized Assembly" by G. Boothroyd and A. H. Redford, McGraw-Hill, London, 1968, pp. 23 and 81) so-called helical bins—also known as vibrating helical conveyors—are used as feeders. Such vibrating helical conveyors consist of a cup-shaped oscillating cask fitted with an oscillating plate, from whose internal wall a circular conveyor in the form of a helix is extended. Components which are supposed to be available in succession are placed on the oscillating plate. The drive of the vibrating feeder conveys the components which are to be arranged on a circular conveyor from the oscillating plate to an outlet at the upper extremity of the cask. The components may then either be fed to the processing area or stored in magazines.

Although vibrating helical conveyors as such are an advantage, they can only accommodate components which, owing to their geometrical shape, do not tend to entangle, or which have already been disentangled by a separate disentangler. Therefore, it is not possible to place a pile of tangled components into the vibrating helical conveyor in order to remove them in an order of sequence from the end of the helix. Only in exceptional cases, when dealing with components which can easily be isolated, will the vibratory movement of the vibrating helical conveyor isolate such components.

Therefore, a particularly practical aspect of the invention provides that the disentangling plate is arranged at the lower end of the oscillating cask of the vibrating helical conveyor and that it forms the inner part of the conveyor's oscillating plate, and that the vibratory drive of the conveyor and the vibrating device technically are separated from one another, so that the disentangling plate and the oscillating cask move independently.

It thus is a combination of the disentangling device and the vibrating helical conveyor. The inner part of the conveyor's oscillating plate is virtually replaced by the disentangling plate from where the isolated components drop onto the remaining bottom area of the oscillating cask, and are then fed to the top by means of the helix. In order to avoid interference on both sides of the drive, the oscillatory drive of the vibrating helical conveyor and the vibrating device at the disentangling plate are technically separated from one another, so that the plate and the cask may move independently from one another. Thus, a new device is created, allowing the components entangled in a pile to be isolated so that they may be fed in continuous sequence to a processing area or stored in a magazine.

The invention in its functional design is such that the receiving area, which forms the beginning of the helices of the vibrating helical conveyor, grips under the external edge of the disentangling plate so that the isolated components will safely drop into the receiving area. Furthermore, it is provided that the extreme edge of the disentangling plate is fitted with a side panel so that the helix rising from the receiving area is situated at about the same height as the extreme edge, thus preventing components from dropping from the plate onto the rising helix. In order to enable the helical track to extend perfectly at the inside wall of the oscillating cask, the disentangling plate is fitted with a suitable recess where the helix "passes" the plate, so that the disentangling plate is free to move without touching the helix.

In practice it often is desirable that the individual components not only have a continuous order of sequence, but also have a specific alignment or position to be fed to a processing area or stored in a magazine. From the aforementioned state of technology it is generally known that for this purpose the path of conveyance, i.e., the helix of the vibrating helical conveyor, is equipped with so-called alignment aids.

The alignment aids enable the components to leave the helix at the upper extremity of the oscillating cask if they are arranged in a specific and defined alignment. Components which are not thus aligned are forceably "pushed down" from the helix by means of the alignment aid. Recirculating devices are provided for helices equipped with such alignment aids, thus enabling the pushed-down components to fall onto the disentangling plate rather than onto the lower helical path.

A functional aspect of the invention provides that the oscillating cask of the vibrating helical plate is tapered toward the top in such a way that the components pushed down by the alignment aids fall from the helix onto the disentangling plate as desired. A further advantageous development of the invention provides a recirculating funnel with a wall inclined toward the bottom which is situated above the disentangling plate as well as funnel outlet, whereby the recirculating funnel is attached to the bottom of the upper helical path containing the alignment aid, and extends below the helix. This ensures that the components pushed down by the alignment aids will fall from the helix via recirculating funnels onto the disentangling plate.

BRIEF DESCRIPTION OF THE DRAWINGS

In the following, the invention will be explained more clearly by means of the structural features illustrated in the drawing.

BEST MODE OF CARRYING OUT THE INVENTION

Figure 1:
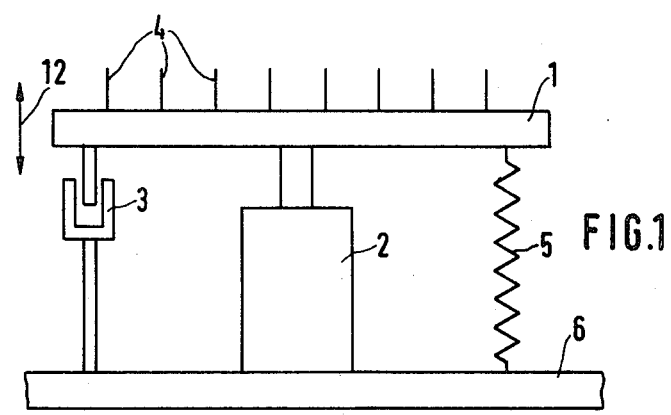
FIG. 1 general description of the invented device in the form of a side elevation, FIG. 2 simplified side elevation of a different design, FIG. 3 perspective of a disentangling plate equipped with pins and side panels (also termed "nail board disentangler"), FIG. 4 simplified description of a different design of the invention, FIG. 5 a development of the invention with a disentangling plate in the form of a flexible diaphragm, FIG. 6 a bin for designs indicated in FIG. 4 or FIG. 5, FIG. 7 perspective of a known vibrating helical conveyor, FIG. 8 simplified sectional view of a design of the invention in which the lines of intersection are not completely shown, so as to give a clearer view, FIG. 9 simplified sectional view of a different type of design of the invention in which again the lines of intersection are not completely shown, so to give a clearer view, and FIG. 10 perspective of a known helix equipped with alignment aids.

FIG. 1 shows the lateral view of disentangling plate 1 which, for example, has a rectangular surface. The disentangling plate 1 is driven pneumatically by a piston vibrator 2. The piston-type vibrator 2 is mounted on a base plate 6. A spring 5 and a guideway 3 are situated between the base plate 6 and the disentangling plate 1. The piston vibrator 2 drives the disentangling plate 1 in such a way that reciprocal movements in vertical direction 12 are effected. The spring 5 ensures that these movements are alternately checked or supported, so that the disentangling plate preferably effects harmonic vertical oscillations. The pile 7 (not shown in FIG. 1, see FIG. 2) on the disentangling plate 1 is constantly subjected to a lifting/impact process, thus enabling the individual components to become isolated from the pile. The disentangled components are subjected to a higher impact coefficient than the pile, and they fall off the disentangling plate 1.

As demonstrated in FIG. 1, vertically arranged pins or nails 4 may be fitted to the disentangling plate 1. The nails 4 on the disentangling plate 1 prevent horizontal movement of the stored pile. Individual components easily pass through the retainer pins. There is sufficient space around the retainer pin area, thus enabling the isolating process of components in all directions.

The variations of pressure in the pneumatic drive enables disentangling of items or processing components with varying hook shapes. Therefore, the size and volume of components have a negligible influence on the disentangling behavior. Owing to the open design, interferences are quite unlikely and can easily be remedied. The device may be fitted with a suitable control, e.g., a foot switch not included in the drawing; it may, as a handling support, supply an assembly point with isolated components or items.

Figure 2:
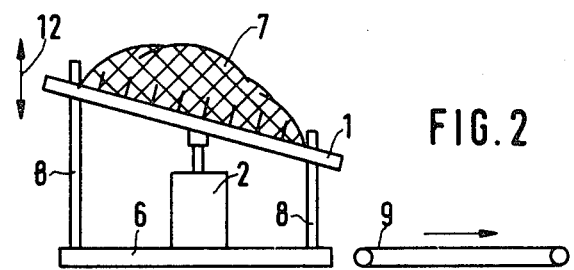

The device shown in FIG. 2 has a sloped disentangling plate 1 and is fitted with guide rods 8. A conveyance system 9, e.g., a simple conveyor belt, is attached to the sloped side of the disentangling device 1. Again, the sloped disentangling plate is fitted with pins 4, so that the pile of entangled components is prevented from slipping. The pneumatic piston-type vibrator 2 effects reciprocal motions in vertical direction 12 of the disentangling plate 1, whereby the disentangling plate 1 having suitable outlets is guided by means of guide rods 8. Due to the succession of vertical accelerations (lifting the pile from the disentangling plate 1) and impact (falling back onto the disentangling plate 1), the pile 7 is dissolved. Until the entire pile 7 has been dissolved, it is retained in position by the pins 4. Individual components may slip out from between the pins 4 and the disentangling zone. Components can slip out easily due to the slight sloping position of the disentangling plate 1 which, during vertical lift, places components in the emergent direction. The isolated components drop onto the conveyor belt 9 which feeds them to the assembly point.

If the disentangling plate 1—as shown in FIG. 1—is arranged in a horizontal position, it is advantageous to create a current of air above the disentangling plate 1. Thus, the isolated components are able to drop more easily.

The essential spring 5 shown in FIG. 1 may also be arranged on both sides of the disentangling plate 1, i.e., above and beneath the plate.

Figure 3:
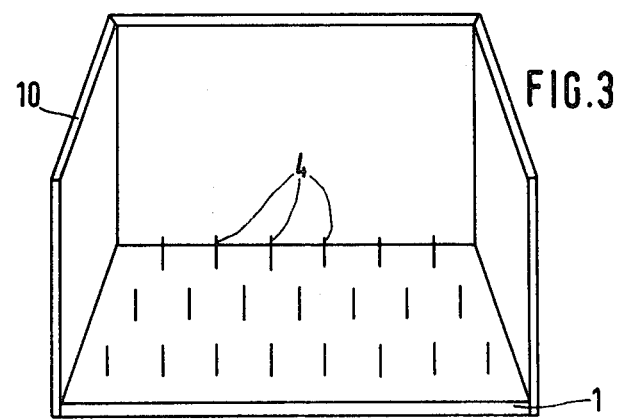

The arrangement of pins or nails 4 on the disentangling plate 1 is particularly well illustrated in FIG. 3. A device equipped with this type of disentangling plate 1 will hereinafter be termed "nail board disentangler." To simplify matters, the pneumatic piston-type vibrator 2 is not included in FIG. 3. In order to create a definite zone of emergence for the isolated components, the disentangling plate 1, with the exception of one border, is fitted with a side panel 10.

FIG. 4 shows a bin 11 adjacent to the disentangling plate 1 which, with the exception of the sides adjacent to the disentangling plate 1, on all sides is enclosed by a wall, but is open at the top. Thus, the bin 11 forms a storage area for the pile 7. The bin 11 is mounted on a linear conveyor 14, so that the pile 7 contained within the geometric boundaries cyclically is advanced from the bin 11 toward the disentangling plate 1. The linear conveyor 14 feeds an approximately constant number of components per cycle into the disentangling process. Therefore, the disentangling process is almost stationary. The device shown in FIG. 4 thus has a defined disentangling zone. The content of the bin is not moved during disentangling; only a small section of the pile is admitted with disentangling movement. By means of an appropriate control of the linear conveyor 14, it is possible to advance a defined number of components into the disentangling zone. The same result may also be obtained with a bin 11, using a conveyor belt 16 with controllable speed and operating cycle. It is particularly advantageous that the form of the pile can be influenced by adjustable (compare with arrow 17) side panels 15 of the bin 11, in order to feed per cycle of time a desired quantity of components to the disentangling plate 1. The side panels are arranged vertically and are slidable transversely in the direction of conveyance. The conveyor belt forms the bottom of the bin, as is illustrated in FIG. 6.

Similarly, as in FIGS. 1 and 2 the disentangling plate 1 in FIG. 4 is driven by means of pneumatic piston-type vibrator 2 combined with the springs 5. The described sinusoidal oscillation is to indicate that the disentangling plate 1 effects harmonic vertical oscillations 12. The disentangling plate can be fitted with two panels (not illustrated) running parallel to the plane, so that a defined outlet exists for the disentangled components. The disentangled components drop onto a conveyance system 9, wherefrom they may be fed to an assembly point.

Owing to the design described in FIG. 4, two defined separate areas are created, i.e., the storage zone and the disentangling zone. This separation has several advantages. Thus, the emergence of components (quantity of isolated components per time unit) is independent from the contents of the bin. In contrast to other known devices, the disentangling zone is well defined and the emergence of components is controllable. All isolated components may be discharged, and re-tangling is virtually impossible. Furthermore, the processing components or tangled items are only admitted into the disentangling zone through the motive force, thus preventing faults and mechanical deformations. Finally, the other advantage is that the storage quantity is relatively unlimited, whereas known devices can only store a limited amount of components because, owing to the fact that storage zone and disentangling zone are not separated from one another, all components have to be moved simultaneously. In this invention, however, only one defined part section of the pile is moved, whereas the remainder of the pile remains stationary.

The above-mentioned areas of operation can be defined as follows. Storage zone: an area in which a quantity of component is kept readily available, which directly determines the refill time. Furthermore, the storage zone fulfills the function of conveying the pile into the disentangling zone. Disentangling zone: an area in which the tangled pile is given motive force, in order to create a random motion within the pile which enables the individual components to become isolated from the pile. FIG. 4 shows the pneumatic piston-type vibrator 2 which serves to produce the motive force. However, it is also possible to introduce other forces in cooperation with the field of earth (gravitational power) into the pile 7. The vertical oscillation of the disentangling plate 1 can, for example, achieve accelerations in the pile of up to 4 g.

The partitioning into storage zone, disentangling zone and, if the occasion arises, into conveyance zone as illustrated in FIG. 4, creates a device similar in principle to modular construction or system. The individual areas are very easily adaptable to different types of tangled components. When dealing with relatively large components, correspondingly larger bins 11 and a correspondingly larger disentangling plate 1 can be provided. Conversely, when dealing with relatively small components, bins 11 and disentangling plates 1 can be exchanged for correspondingly smaller types. In contrast to the known devices, great flexibility can be attained with regard to components or items that are to be isolated. Further adaptability to components that are to be isolated can be attained by controlling the vertical lift of the vertical oscillations 12, as well as controlling the frequency of the vertical movement. Finally, the advance cycle (period of conveyance/interval) of the linear conveyor 14 for the bin 11 can also be adjusted.

The design illustrated in FIG. 5 differs from that in FIG. 4 insofar as the disentangling plate is designed in the form of a flexible diaphragm 12′. A striking device 13 is disposed underneath the diaphragm, so that vertical reciprocal movements at the diaphragm 12′ are also created. As mentioned above, the components of the pile are isolated by the reciprocal movement in vertical direction and conveyed by a conveyance system. The two springs 5 ensure that the diaphragm, when in position of rest, is stretched tightly. In any other respect, the devices illustrated in FIGS. 4 and 5 are of an identical design, particularly as the storage and disentangling zones are partitioned. The above-mentioned advantages, therefore, are also applicable to the device illustrated in FIG. 5.

FIG. 7 shows a known vibrating helical conveyor 21 whose oscillating cask 20 is driven by a vibratory drive 22. The vibratory drive 22 consists of an electro-magnet 22a and spring elements 22b. Owing to the force of the vibratory drive 22, the components at the bottom of the oscillating cask 20 are moved toward the inside wall of the oscillating cask 20 from where they are conveyed alongside a path of conveyance, formed by a rising helix 23, to an outlet 19 at the top of the oscillating cask. The components thus emerge from the outlet 19 in continuous sequence, as is described in the above-mentioned technical literature.

According to the invention, the device makes use of the known advantages of a vibrating helical conveyor, and makes it possible that these advantages take effect in the pile of tangled components. A sectional view of the design in FIG. 8 shows that the inner part of the oscillating bottom of a vibrating helical conveyor 21 is virtually replaced by a disentangling plate 1. The disentangling plate 1 excites the vibratory device 2, effecting the vertical reciprocal motion without touching the oscillating cask 20 or the helix 23 of the oscillating cask. An almost harmonic oscillation is achieved by means of the springs 5 provided between the disentangling plate 1 and the base plate 6. As already described in the above, the components entangled in the pile 7 are isolated owing to the vertical oscillations, and the isolated components then drop from the disentangling plate 1.

The isolated components are conveyed from the disentangling plate 1, which is arranged slightly above the initial oscillating bottom, into a receiving area 24 which has remained as part of the oscillating bottom and which is limited by boundaries 28 on the side near the center of the oscillating cask. From this receiving area 24 a rising helix 23 extends to the upper part of the oscillating cask 20 and, owing to the force of the drive 22 of the vibrating helical conveyor 21, the components isolated by the disentangling plate 1 are conveyed alongside the helix 23. The vibratory drive 22 is separated from the vibrating device 2. The separation of both systems enables perfect movements of the disentangling plate 1 and the oscillating cask 20.

The disentangling plate 1 is designed in such a way that, at its highest elevation, it is roof-shaped, thus favoring the isolation of the components contained in the pile 7. In order to enable the rising helix 23 to pass trouble-free alongside the inner wall of the oscillating cask 20, the disentangling plate 1 is fitted with a suitable recess (not shown) where it is level with the rising helix 23, which is adapted to the helix's 23 course. Furthermore, the outer edge of the disentangling plate 1 is fitted with a vertically upright side panel (not shown) preventing isolated components to drop from the disentangling plate 1 onto the helix 23.

As mentioned above, in many cases it is desirous to remove the isolated components at the outlet 19 of the vibrating helical conveyor 21 in accordance with a defined alignment. For this purpose, generally known alignment aids 25, 26 (compare with FIG. 10) are fitted to the helix 11, so that components, which do not reach the alignment aids 25, 26 in a given position, are pushed down by the helix. So as to ensure that the pushed down components reach the disentangling plate 1, a recirculating funnel 27, as shown in FIG. 8, is provided underneath the helical path containing the alignment aids, which is fitted to the helix 23 above the mount 29. The recirculating funnel 27 has an inlet situated above the disentangling plate 1, through which the components pushed down by the helix 23 pass onto the disentangling plate 1, so as to prevent them from falling onto the helical paths underneath the recirculating funnel 27.

In order to enable such a recirculation, the oscillating cask 20 illustrated in FIG. 3 has a conical design so that the components pushed down by alignment aids from a higher helical path drop onto the disentangling plate 1 and not onto the helical paths underneath. The upper inlet of the oscillating cask 20 is chosen in such a way that the components entangled in the pile 7 can easily be brought onto the disentangling plate 1 which is equipped with vertically arranged nails 4 so as to enhance the disentangling process. Deviating from the design illustrated in FIG. 8, the one in FIG. 9 provides only one spring 5 coupled to the vibrating device 2 as well as to the guideway 3, thus ensuring reciprocal motion in vertical direction. Furthermore, it is practical to arrange the vibrating device 2 for the disentangling plate 1 as well as the vibratory drive 22 for the oscillating cask 20 on a common base plate 6.

According to this invention, the width of the receiving area 24, to which the isolated components are conveyed from the disentangling plate 1, is of some significance. If the width is too small and many relatively large entangled components drop onto the surface 24, there may be a risk that these already isolated components, which are subjected to the movements of the oscillating cask 20, become retangled and that, therefore, an undesirable retangling process takes place. Such a retanglement can be expected, particularly when the number of items dropping from the disentangling plate 1 onto the receiving area 24 is in excess of those reconveyed alongside the helix to the top of the oscillating cask 20. It is thus considered advantageous that the width of the receiving area 24, determined by the inner wall of the oscillating cask 20 and the boundary 28, is adjustable depending on the components that are to be disentangled.

FIG. 10 illustrates the effect of the known alignment aids 25 and 26. In the illustrated example, rectangular components 30 are conveyed alongside the helical path 23. These rectangular components 30 are to be aligned in such a way that they can be removed longitudinally. The first alignment aid 25 arranged alongside the path of conveyance causes that only non-upright components 30 may pass the alignment aid 25 in the direction of arrow A. As indicated by arrow B, the upright components are pushed down by the helix 23. Finally, the adjoining alignment aid 26 forcibly causes those components 30, which have not yet been erected, to be erected in the desired position. The example merely is intended to illustrate the principle of alignment aids. Obviously, depending on the geometric shape of the components and the desired alignment, they may be designed in a variety of ways. A decisive factor is that, according to the invention, with this device those components, which are pushed down from the helix 11 by means of the alignment aids, are returned to the disentangling plate 1 which virtually forms the bottom of the oscillating cask 20 of a vibrating helical conveyor 21.

What is claimed is:

1. A device for disentangling components from a cluster of entangled components including a disentangling plate, and vibrator means coupled to drive said plate and formed to impart reciprocal movement to said plate, wherein the improvement in said device comprises:

said plate being an imperforate, continuous plate formed for support of a bottom side of said cluster of components directly in contact with said plate during reciprocal movement thereof;

a plurality of pins extending vertically from an upwardly facing side of said plate for support of said cluster of entangled components against movement in a horizontally extending direction, said pins being relatively spaced apart at a distance permitting support of said bottom side of said cluster directly on said plate and permitting movement of disentangled components in a horizontally extending direction along said plate;

guideway means formed for guided vertical reciprocation of said plate;

said vibrator means being formed for vertical reciprocal movement of said plate to produce alternate vertical lifting and impacting of said cluster against said plate; and said vibrator means being further formed to enable controlled change of the amplitude and frequency of said vertical reciprocal movement to change the rate and magnitude of lifting and impacting of said cluster against said plate.

2. A device for disentangling entangled components including a disentangling plate formed for receipt and support of entangled components directly thereon over substantially the entire area thereof, and vibrator means coupled to drive said plate and formed to impart vertical reciprocal movement to said plate, said vibrator means being further formed to enable controlled change of the vertical amplitude and the frequency of said reciprocal movement, wherein improvement in said device comprises:

said plate is formed as a flexible diaphragm, and said vibrator means is formed as a striking device disposed beneath said diaphragm for engagement and vertical displacement of said diaphragm.

3. The component disentangling device as defined in claim 2, and spring means coupled to said diaphragm and formed to apply a tension force to said diaphragm.

4. A device for disentangling entangled components including a disentangling plate formed for receipt and support of entangled components directly thereon over substantially the entire area thereof, vibrator means coupled to drive said plate and formed to impart vertical reciprocal movement to said plate, said vibrator means being further formed to enable controlled change of the vertical amplitude and the frequency of said reciprocal movement, and vibrating helical conveyor having a peripheral cask formed with a central opening therein, said helical conveyor being positioned around said plate, said helical conveyor and said plate being formed for vibration independently of each other, wherein the improvement comprises:

said peripheral cask being formed with an upwardly extending, uninterrupted, helical, conveying path structure on an inner wall thereof, said path structure having a receiving area positioned below said plate for discharge of disentangled parts from said plate onto said receiving area, said path structure further being formed to extend from said receiving area upwardly beyond said plate, and one of said plate and said path structure being formed to prevent passage of disentangled elements from said plate to said path structure at the level of said plate.

5. The component disentangling device as defined in claim 4, wherein,
said path structure further is formed with component alignment means formed to align disentangled components in a predetermined orientation on said path structure, said path structure being further formed with recirculation means formed to return disentangled components to said plate in the event that they are not aligned by said alignment means.

6. The component disentangling device as defined in claim 5 wherein,
said peripheral cask is formed with an inwardly tapering wall for discharge of disentangled components onto said plate upon failure of said alignment means to align said disentangled components.

7. The component disentangling device as defined in claim 5 wherein,
said recirculation means includes funnel means formed and positioned to receive disentangled components from said path structure upon failure of said alignment means to align said disentangled components and formed to discharge disentangled components onto said plate.

8. The component disentangling device as defined in claim 4 wherein,
said plate is formed with a roof-shaped tapered conical upper surface.

9. The component disentangling device as defined in claim 4 wherein,
a plurality of relatively spaced apart pins extending from the upwardly facing surface of said plate to retain entangled components on said plate.

10. The component disentangling device as defined in claim 4 wherein,
said path structure at said receiving area is formed with an upwardly extending border flange partially defining said receiving area.

* * * * *